(12) United States Patent
Li et al.

(10) Patent No.: US 8,711,071 B2
(45) Date of Patent: Apr. 29, 2014

(54) DISPLAY FOR DISPLAYING THREE-DIMENSIONAL IMAGES AND METHOD FOR DISPLAYING THREE-DIMENSIONAL IMAGES

(75) Inventors: Hung-Chun Li, New Taipei (TW); Bo-Wei Lan, Taipei (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 132 days.

(21) Appl. No.: 13/533,988

(22) Filed: Jun. 27, 2012

(65) Prior Publication Data

US 2013/0215104 A1  Aug. 22, 2013

(30) Foreign Application Priority Data

Feb. 16, 2012 (TW) ............................. 101105062 A

(51) Int. Cl.
*G09G 3/36* (2006.01)
(52) U.S. Cl.
USPC .................................. 345/87; 349/15; 348/51
(58) Field of Classification Search
USPC ........................................... 345/87–102, 7–9
See application file for complete search history.

(56) References Cited

U.S. PATENT DOCUMENTS

| 7,920,216 | B2 | 4/2011 | Hsu | |
|---|---|---|---|---|
| 8,614,772 | B2* | 12/2013 | Lin | 349/15 |
| 2010/0189413 | A1* | 7/2010 | Yoshino | 386/83 |
| 2011/0242150 | A1* | 10/2011 | Song et al. | 345/697 |
| 2012/0019736 | A1* | 1/2012 | Yamamoto et al. | 349/15 |
| 2012/0098931 | A1* | 4/2012 | Wirtz | 348/43 |
| 2012/0120476 | A1* | 5/2012 | Yeh et al. | 359/270 |
| 2012/0229613 | A1* | 9/2012 | Yoshida et al. | 348/56 |

\* cited by examiner

*Primary Examiner* — Duc Dinh
(74) *Attorney, Agent, or Firm* — Winston Hsu; Scott Margo

(57) ABSTRACT

A display includes a gravity sensor, a timing controller, a backlight module, a first liquid crystal panel, a liquid crystal driver, and a second liquid crystal panel. The gravity sensor generates a direction signal. The timing controller receives a three-dimensional image, outputs a left eye image and a right eye image of the three-dimensional image in turn, outputs a control signal, and outputs a backlight control signal. The backlight module turns on a backlight. The first liquid crystal panel receives and displays the left eye image and the right eye image of the three-dimensional image. The liquid crystal driver receives the control signal and the direction signal, and outputs a voltage control signal. The second liquid crystal panel rotates liquid crystals within the second liquid crystal panel according to the voltage control signal.

23 Claims, 12 Drawing Sheets

DISPLAY FOR DISPLAYING THREE-DIMENSIONAL IMAGES AND METHOD FOR DISPLAYING THREE-DIMENSIONAL IMAGES

BACKGROUND OF THE INVENTION

1. Field of the Invention

The present invention relates to a display for displaying three-dimensional images and a method for displaying three-dimensional images, and particularly to a display for displaying three-dimensional images and a method for displaying three-dimensional images that provide correct three-dimensional images to a viewer even when the display is rotated to any position.

2. Description of the Prior Art

Please refer to FIG. 1. FIG. 1 is a diagram illustrating a liquid crystal retarder three-dimensional (LC Retarder 3D) system 100. The LC Retarder 3D system 100 includes a first liquid crystal module 102, a second liquid crystal panel 104, and a timing controller 108. The first liquid crystal module 102 is used for displaying a left eye image and a right eye image of a three-dimensional image. The second liquid crystal panel 104 is installed between the first liquid crystal module 102 and a pair of polarized glasses 106. A left eye lens 1062 of the pair of polarized glasses 106 has a polarizing coating with polarization angle 135°, and a right eye lens 1064 of the pair of polarized glasses 106 has a polarizing coating with polarization angle 45°.

Please refer to FIG. 2A, FIG. 2B, and FIG. 2C. FIG. 2A is a diagram illustrating a left eye of a viewer viewing a left eye image of a three-dimensional image displayed by the first liquid crystal module 102 through the second liquid crystal panel 104 and the left eye lens 1062, FIG. 2B is a diagram illustrating a right eye of the viewer viewing a right eye image of the three-dimensional image displayed by the first liquid crystal module 102 through the second liquid crystal panel 104 and the right eye lens 1064, and FIG. 2C is a timing diagram illustrating an operating timing of the LC Retarder 3D system 100. As shown in FIG. 2A and FIG. 2C, when the first liquid crystal module 102 receives the left eye image of the three-dimensional image (at a period T1), because a control signal RL outputted by the timing controller 108 is at a high voltage VH, the second liquid crystal panel 104 rotates liquid crystals within the second liquid crystal panel 104 according to the control signal RL with the high voltage VH to make the left eye image of the three-dimensional image penetrating the second liquid crystal panel 104 have polarization angle 135°. Similarly, as shown in FIG. 2B and FIG. 2C, when the first liquid crystal module 102 receives the right eye image of the three-dimensional image (at a period T2), because the control signal RL outputted by the timing controller 108 is at a low voltage VL, the second liquid crystal panel 104 rotates the liquid crystals within the second liquid crystal panel 104 according to the control signal RL with the low voltage VL to make the right eye image of the three-dimensional image penetrating the second liquid crystal panel 104 have polarization angle 45°. In addition, as shown in FIG. 2C, the period T1 and a period T3 are periods for the first liquid crystal module 102 to rotate liquid crystals within the first liquid crystal module 102 according to the received left eye image, a period T2 is a period for the first liquid crystal module 102 to rotate the liquid crystals within the first liquid crystal module 102 according to the received right eye image, and periods T4, T5, and T6 are periods for turning-on of backlight BL. Thus, as shown in FIG. 2A, the left eye of the viewer can view the left eye image having the polarization angle 135° through the left eye lens 1062 at the periods T4 and T6; as shown in FIG. 2B, the right eye of the viewer can view the right eye image having the polarization angle 45° through the right eye lens 1064 at the period T5.

Please refer to FIG. 3A and FIG. 3B. FIG. 3A is a diagram illustrating the right eye of the viewer viewing the left eye image of the three-dimensional image displayed by the first liquid crystal module 102 through the second liquid crystal panel 104 and the right eye lens 1064, and FIG. 3B is a diagram illustrating the left eye of the viewer viewing the right eye image of the three-dimensional image displayed by the first liquid crystal module 102 through the second liquid crystal panel 104 and the left eye lens 1062. If the first liquid crystal module 102 and the second liquid crystal panel 104 are rotated 90° from a horizontal direction to a vertical direction, when the first liquid crystal module 102 displays a left eye image of a three-dimensional image, the second liquid crystal panel 104 rotates the liquid crystals within the second liquid crystal panel 104 according to the control signal RL with the high voltage VH to make the left eye image of the three-dimensional image penetrating the second liquid crystal panel 104 have a polarization angle 45°. That is to say, after the second liquid crystal panel 104 is rotated 90°, the left eye image of the three-dimensional image having a polarization angle 135° is changed to the left eye image of the three-dimensional image having the polarization angle 45°. Similarly, when the first liquid crystal module 102 displays the right eye image of the three-dimensional image, the second liquid crystal panel 104 rotates the liquid crystals within the second liquid crystal panel 104 according to the control signal RL with the low voltage VL to make the right eye image of the three-dimensional image penetrating the second liquid crystal panel 104 have the polarization angle 135°. That is to say, after the second liquid crystal panel 104 is rotated 90°, the right eye image of the three-dimensional image having the polarization angle 45° is changed to the right eye image of the three-dimensional image having the polarization angle 135°. Therefore, as shown in FIG. 3A, the right eye of the viewer can view the left eye image displayed by the first liquid crystal module 102 through the second liquid crystal panel 104 and the right eye lens 1064, and as shown in FIG. 3B, the left eye of the viewer can view the right eye image displayed by the first liquid crystal module 102 through the second liquid crystal panel 104 and the left eye lens 1062. Thus, the viewer can not perceive a three-dimensional effect of the images.

To sum up, when the first liquid crystal module 102 and the second liquid crystal panel 104 are rotated 90° from the horizontal direction to the vertical direction, the LC Retarder 3D system 100 operating according to a traditional timing cannot display the images with the three-dimensional effect.

SUMMARY OF THE INVENTION

An embodiment provides a display for displaying three-dimensional images. The display includes a gravity sensor, a timing controller, a backlight module, a first liquid crystal panel, a liquid crystal driver, a second liquid crystal panel, and a memory. The gravity sensor is used for generating a direction signal according to a direction of gravity. The timing controller is used for receiving a three-dimensional image, determining output sequence of a left eye image and a right eye image of the three-dimensional image according to the direction signal, outputting a control signal according to a timing of the three-dimensional image, and outputting a backlight control signal corresponding to a vertical blanking interval. The backlight module is coupled to the timing controller for turning on a backlight according to the backlight control signal. The first liquid crystal panel is coupled to the timing controller for receiving and displaying the left eye image and the right eye image of the three-dimensional image. The liquid crystal driver is coupled to the timing controller for outputting a voltage control signal according to the control signal. The second liquid crystal panel is coupled to the liquid crystal driver for rotating liquid crystals within the second liquid crystal panel to a first angle or a second angle according to the voltage control signal. The memory is coupled to the timing controller for receiving and storing the left eye image and the right eye image of the three-dimensional image. The first angle corresponds to a left eye lens of a pair of polarized glasses and the second angle corresponds to a right eye lens of the pair of polarized glasses.

Another embodiment provides a display for displaying three-dimensional images. The display includes a gravity sensor, a timing controller, a backlight module, a first liquid crystal panel, a liquid crystal driver, and a second liquid crystal panel. The gravity sensor is used for generating a direction signal according to a direction of gravity, wherein the direction signal has a corresponding angle. The timing controller is used for receiving a three-dimensional image, outputting a left eye image and a right eye image of the three-dimensional image in turn, outputting a control signal according to a timing of the three-dimensional image, and outputting a backlight control signal corresponding to a vertical blanking interval. The backlight module is coupled to the timing controller for turning on backlight according to the backlight control signal. The first liquid crystal panel is coupled to the timing controller for receiving and displaying the left eye image and the right eye image of the three-dimensional image. The liquid crystal driver is coupled to the timing controller for receiving the control signal and the direction signal, and outputting a voltage control signal according to the control signal and the direction signal. The second liquid crystal panel is coupled to the liquid crystal driver for rotating liquid crystals within the second liquid crystal panel according to the voltage control signal.

Another embodiment provides a method for displaying three-dimensional images. The method includes receiving a three-dimensional image; generating a direction signal according to a direction of gravity; determining output sequence of a left eye image and a right eye image of the three-dimensional image according to the direction signal; outputting a control signal according to a timing of the three-dimensional image; receiving and displaying the left eye image or the right eye image of the three-dimensional image; receiving and storing the left eye image or the right eye image of the three-dimensional image; outputting a voltage control signal according to the control signal; rotating an angle of liquid crystals within a second liquid crystal panel according to the voltage control signal; generating a corresponding image of the three-dimensional image having polarization of the angle of the liquid crystals according to the angle of the liquid crystals within the second liquid crystal panel; outputting a backlight control signal corresponding to a vertical blanking interval; and turning on backlight according to the backlight control signal.

Another embodiment provides a method for displaying three-dimensional images. The method includes receiving a three-dimensional image; generating a direction signal according to a direction of gravity, wherein the direction signal has a corresponding angle; outputting a left eye image and a right eye image of the three-dimensional image in turn; outputting a control signal according to a timing of the three-dimensional image; receiving and displaying the left eye image or the right eye image of the three-dimensional image; receiving the control signal and the direction signal; outputting a voltage control signal according to the control signal and the direction signal; rotating an angle of liquid crystals within a second liquid crystal panel according to the voltage control signal; generating a corresponding image of the three-dimensional image having polarization of the angle of the liquid crystals according to the angle of liquid crystals within the second liquid crystal panel; outputting a backlight control signal corresponding to a vertical blanking interval; and turning on backlight according to the backlight control signal.

The present invention provides a display for displaying three-dimensional images and a method for displaying three-dimensional image. The display and the method utilize a gravity sensor to generate a direction signal, and a timing controller to output a control signal. Then, the timing controller determines output sequence of a left eye image and a right eye image of a three-dimensional image according to the direction signal, and a liquid crystal driver generates a voltage control signal according to the control signal or according to the control signal and the direction signal. Therefore, a second liquid crystal panel can rotate liquid crystals within the second liquid crystal panel to a corresponding angle according to the voltage control signal. Thus, regardless of the display being rotated to any position, a viewer can still view correct three-dimensional images through the present invention.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
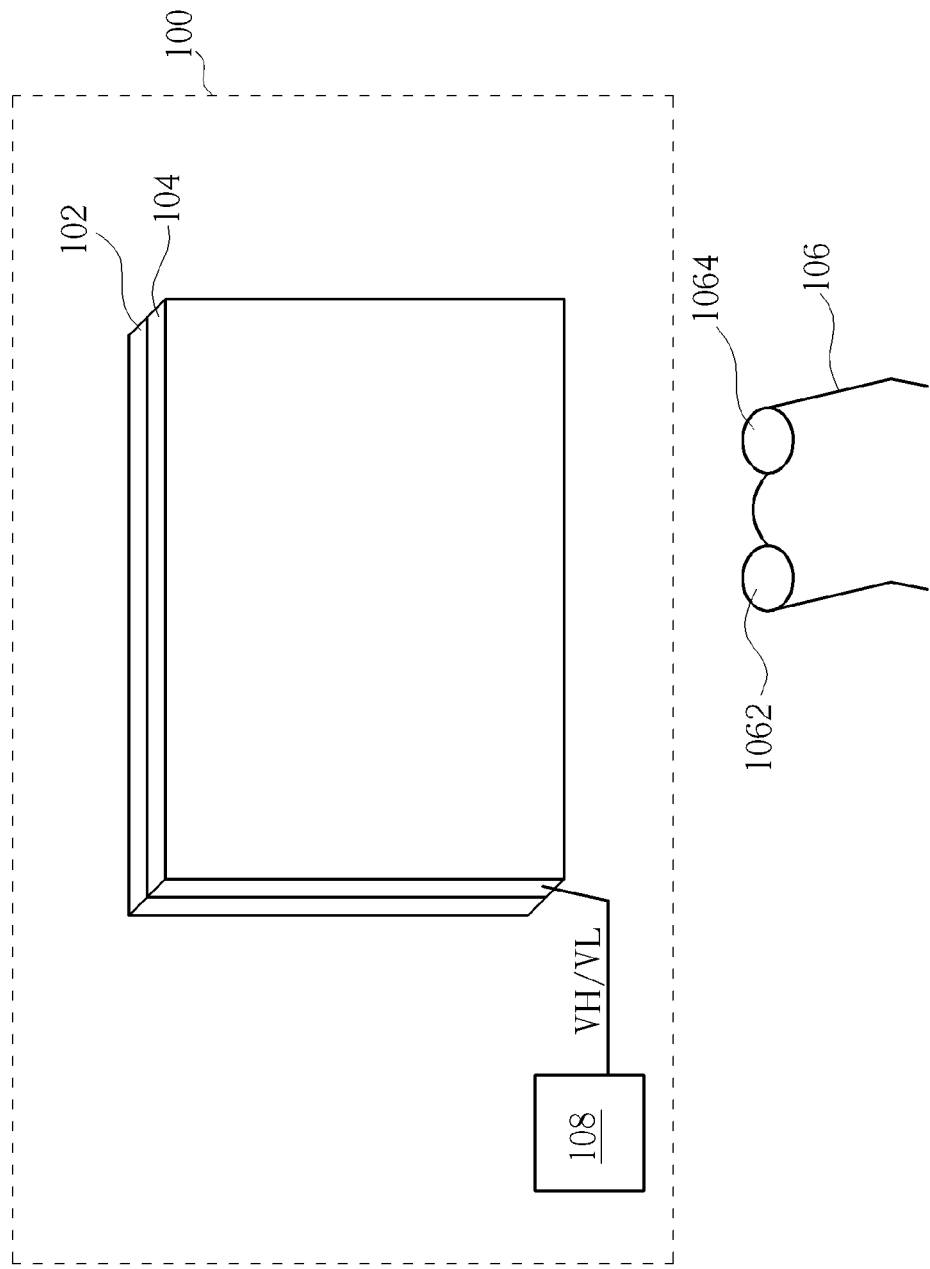
FIG. 1 is a diagram illustrating liquid crystal retarder three-dimensional system.
Figure 2A:
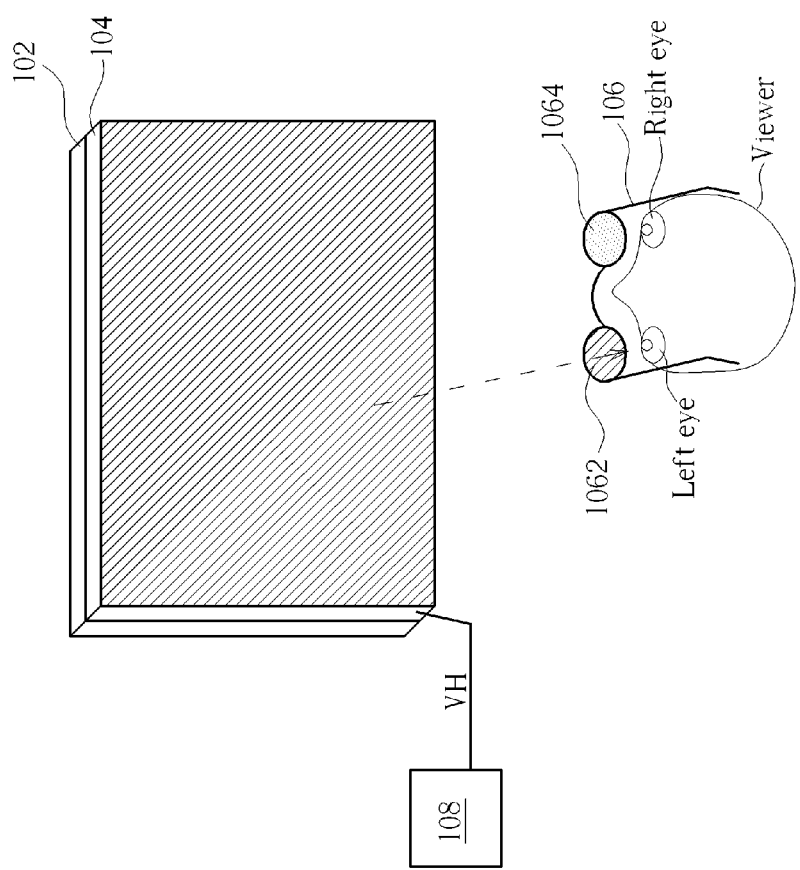
FIG. 2A is a diagram illustrating a left eye of a viewer viewing a left eye image of a three-dimensional image displayed by the first liquid crystal module through the second liquid crystal panel and the left eye lens.
Figure 2B:
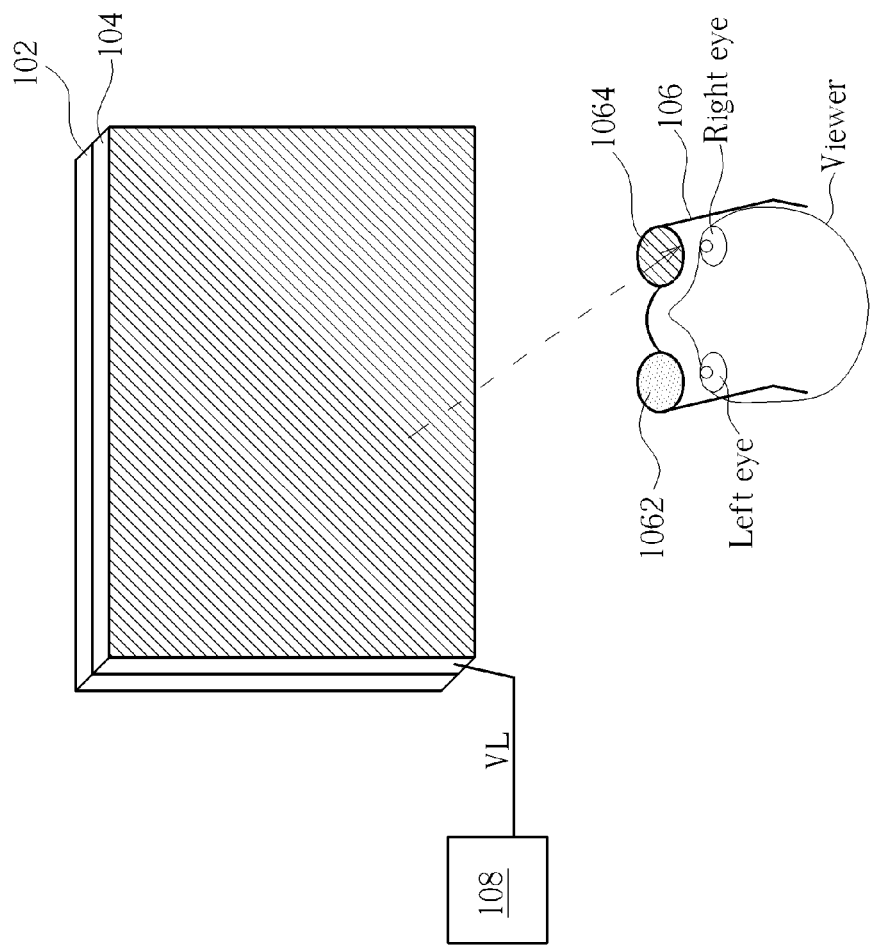
FIG. 2B is a diagram illustrating a right eye of the viewer viewing a right eye image of the three-dimensional image displayed by the first liquid crystal module through the second liquid crystal panel and the right eye lens.
Figure 2C:
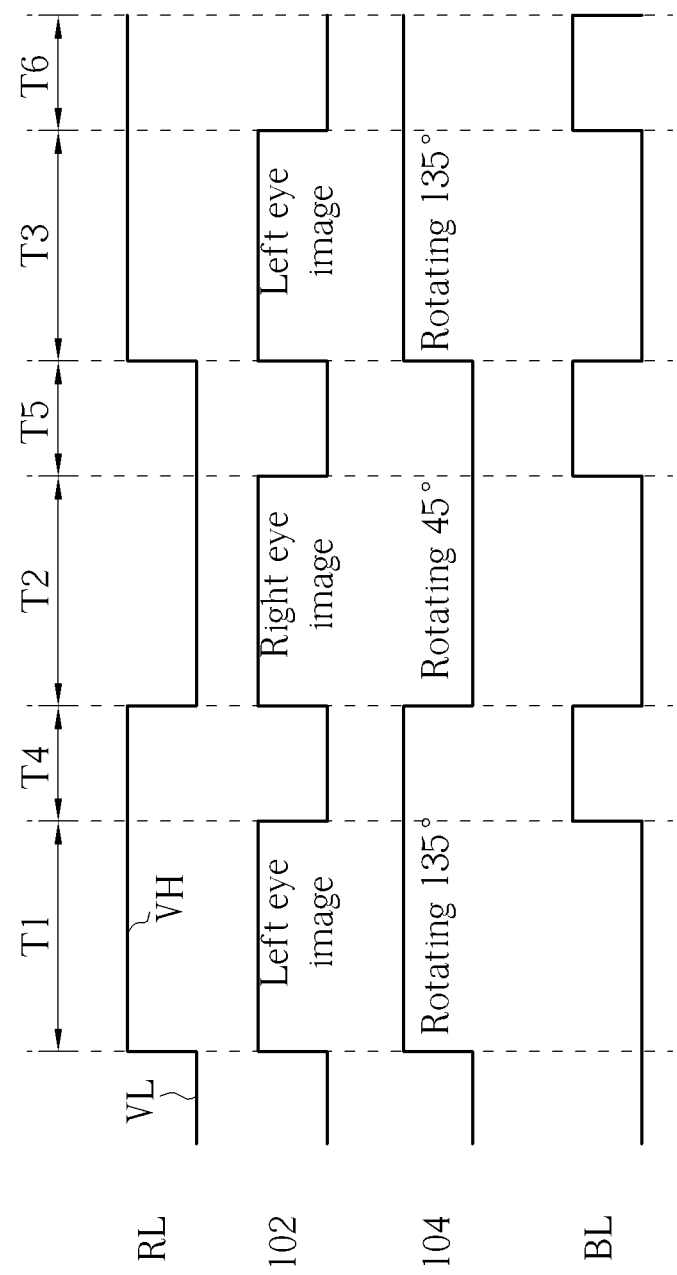
FIG. 2C is a timing diagram illustrating an operating timing of the LC Retarder 3D system.
Figure 3A:
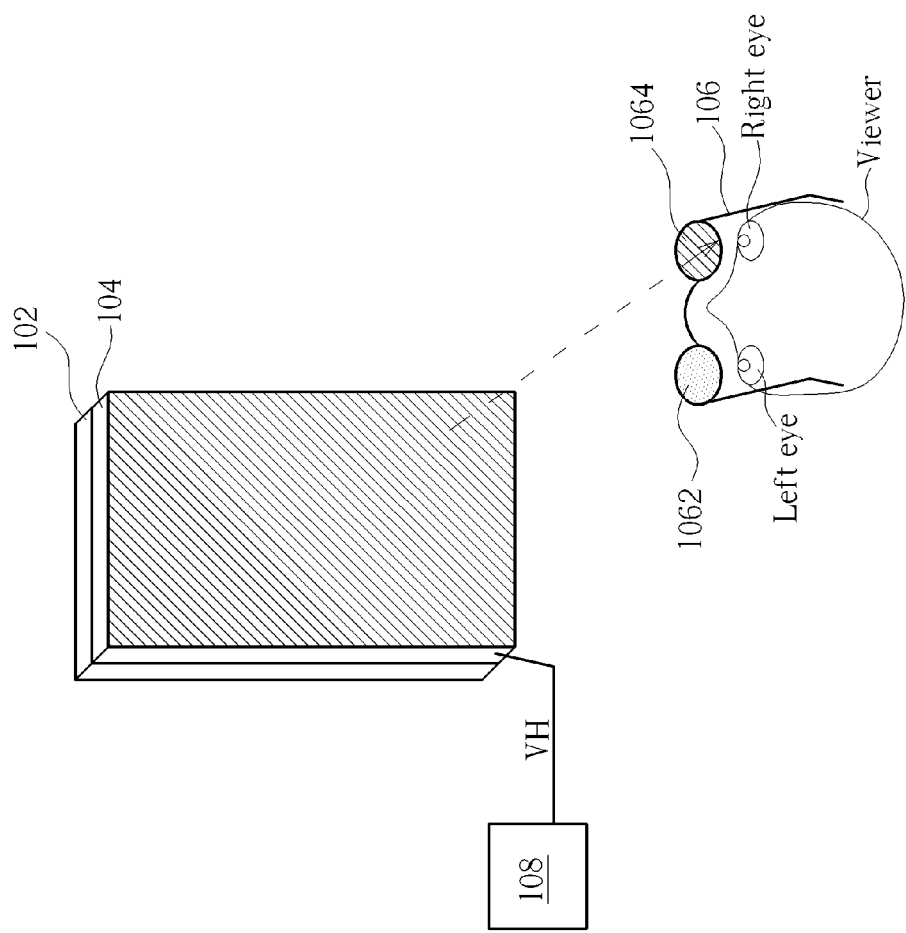
FIG. 3A is a diagram illustrating the right eye of the viewer viewing the left eye image of the three-dimensional image displayed by the first liquid crystal module through the second liquid crystal panel and the right eye lens.
Figure 3B:
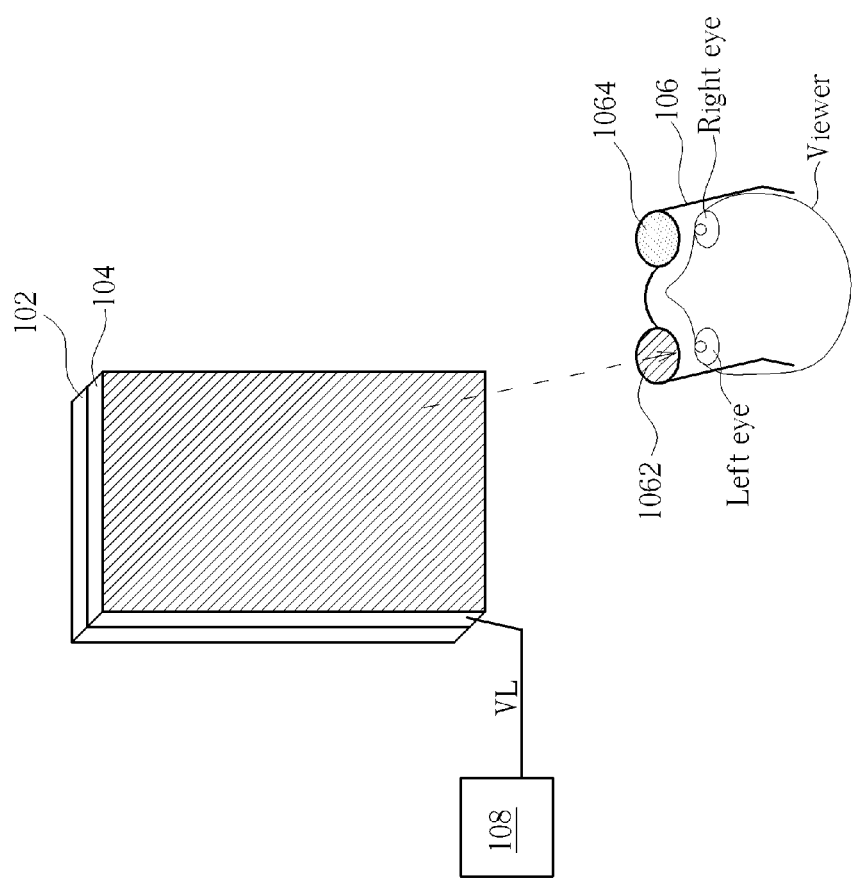
FIG. 3B is a diagram illustrating the left eye of the viewer viewing the right eye image of the three-dimensional image displayed by the first liquid crystal module through the second liquid crystal panel and the left eye lens.
Figure 4:
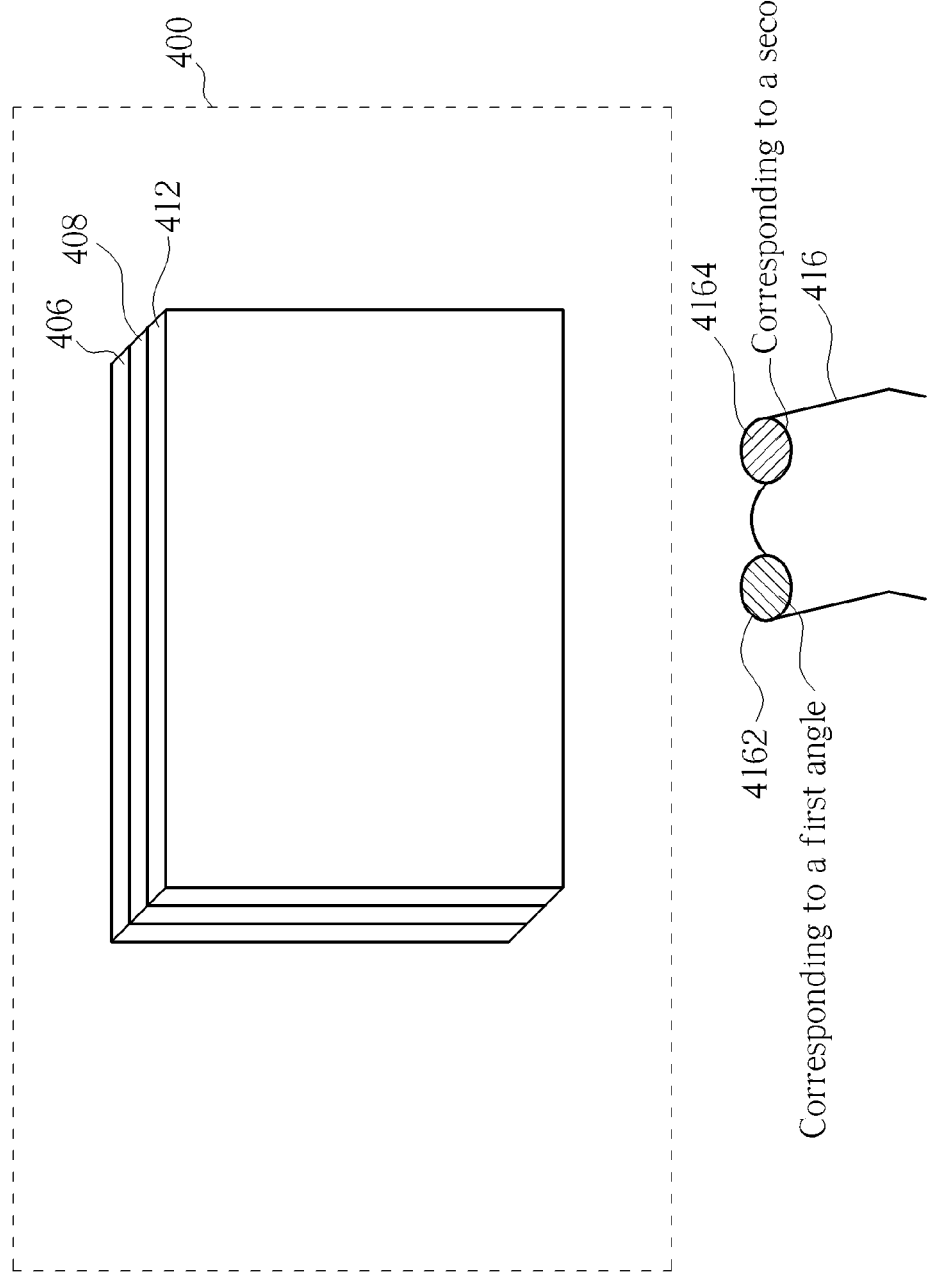
FIG. 4 is a diagram illustrating a display for displaying three-dimensional images according to a first embodiment.
Figure 5:
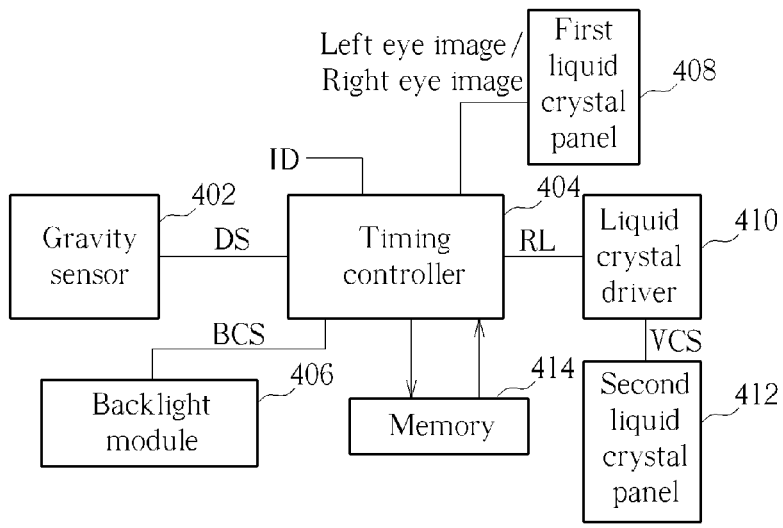
FIG. 5 is a diagram illustrating coupling relationships of the gravity sensor, the timing controller, the first liquid crystal panel, the liquid crystal driver, and the memory.

Please refer to FIG. 4 and FIG. 5. FIG. 4 is a diagram illustrating a display 400 for displaying three-dimensional images according to a first embodiment. The display 400 includes a gravity sensor 402, a timing controller 404, a backlight module 406, a first liquid crystal panel 408, a liquid crystal driver 410, a second liquid crystal panel 412, and a memory 414. FIG. 5 is a diagram illustrating coupling relationships of the gravity sensor 402, the timing controller 404, the first liquid crystal panel 408, the liquid crystal driver 410, and the memory 414. As shown in FIG. 5, the gravity sensor 402 is used for generating a direction signal DS according to a position of the first liquid crystal panel 408 and a direction of gravity. The timing controller 404 is used for receiving a three-dimensional image ID, determining output sequence of a left eye image and a right eye image of the three-dimensional image ID according to the direction signal DS, and outputting a control signal RL and outputting a backlight control signal BCS corresponding to a vertical blanking interval VBLANK according to a timing of the three-dimensional image ID. The backlight module 406 is coupled to the timing controller 404 for turning on backlight according to the backlight control signal BCS. The first liquid crystal panel 408 is coupled to the timing controller 404 for receiving and displaying the left eye image and the right eye image of the three-dimensional image ID. The liquid crystal driver 410 is coupled to the timing controller 404 for outputting a voltage control signal VCS according to the control signal RL. The second liquid crystal panel 412 is coupled to the liquid crystal driver 410 for rotating liquid crystals within the second liquid crystal panel 412 to a first angle or a second angle according to the voltage control signal VCS. The memory 414 is coupled to the timing controller 404 for receiving and storing the left eye image and the right eye image of the three-dimensional image ID. As shown in FIG. 4, the first angle corresponds to a left eye lens 4162 of a pair of polarized glasses 416 and a second angle corresponds to a right eye lens 4164 of the pair of polarized glasses 416.

Figure 6:
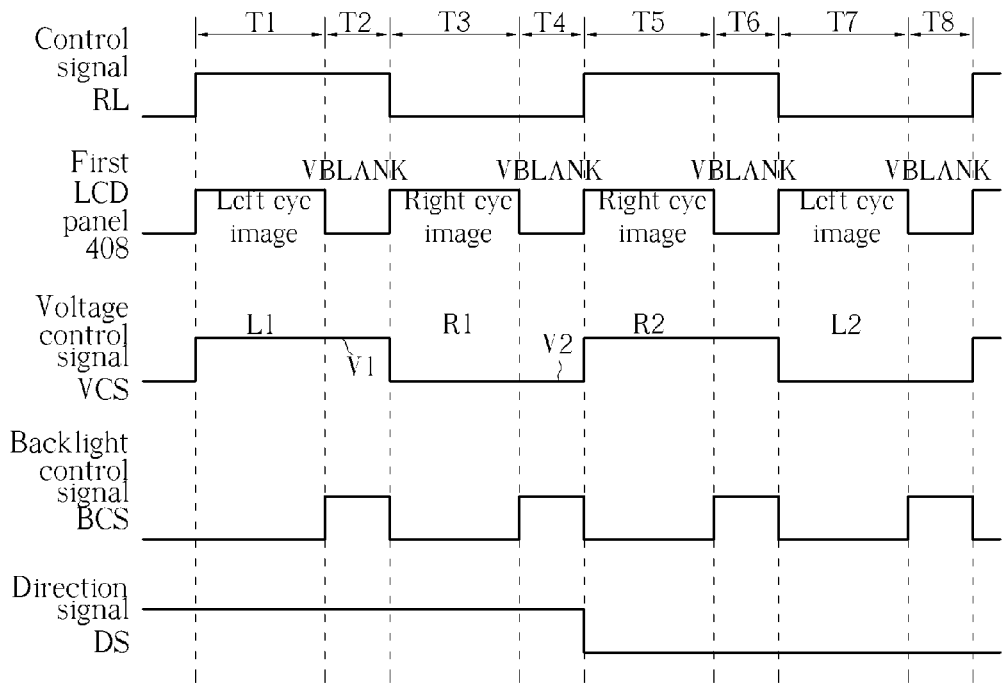
FIG. 6 is a timing diagram illustrating a control signal, output sequence of a left eye image and a right eye image outputted by the first liquid crystal panel, angles of the liquid crystals within the second liquid crystal panel, backlight control signal, and a direction signal of the display.

Please refer to FIG. 4 and FIG. 6. FIG. 6 is a timing diagram illustrating a control signal RL, output sequence of a left eye image and a right eye image outputted by the first liquid crystal panel 408, angles of the liquid crystals within the second liquid crystal panel 412, a backlight control signal BCS, and a direction signal DS of the display 400. As shown in FIG. 6, at a period T1, because the first liquid crystal panel 408 is at a horizontal position (e.g. a longer side of the first liquid crystal panel 408 is parallel to the horizontal plane), the direction signal DS generated by the gravity sensor 402 according to the horizontal position of the first liquid crystal panel 408 is at a high voltage. That is to say, when the first liquid crystal panel 408 is at the horizontal position, the gravity sensor 402 generates the direction signal DS with the high voltage according to a relationship between three axes of the gravity sensor 402 and a direction of gravity. But the present invention is not limited to the horizontal position of the first liquid crystal panel 408 being the longer side of the first liquid crystal panel 408 parallel to the horizontal plane, and not limited to the direction signal DS generated by the gravity sensor 402 according to the horizontal position of the first liquid crystal panel 408 being at the high voltage. Meanwhile, the timing controller 404 determines to output a left eye image L1 of the three-dimensional image ID to the first liquid crystal panel 408, and output the control signal RL with a high voltage according to the direction signal DS. The liquid crystal driver 410 outputs a voltage control signal VCS (corresponding to a first voltage V1) according to the control signal RL with the high voltage. Therefore, the liquid crystals within the second liquid crystal panel 412 are rotated to a first angle (such as 135°) according to the first voltage V1. At a period T2, because the timing controller 404 outputs the backlight control signal BCS corresponding to the vertical blanking interval VBLANK, the backlight module 406 turns on a backlight according to the backlight control signal BCS. Therefore, at the period T2, because the second liquid crystal panel 412 rotates the liquid crystals within the second liquid crystal panel 412 according to the voltage control signal VCS with the first voltage V1 to make the left eye image L1 penetrating the second liquid crystal panel 412 have polarization of the first angle, and the backlight module 406 turns on the backlight according to the backlight control signal BCS, a left eye of a viewer can view the left eye image L1 having the polarization of the first angle through the left eye lens 4162 at the period T2.

Similarly, at a period T3, because the first liquid crystal panel 408 is still at the horizontal position, the direction signal DS generated by the gravity sensor 402 is still at the high voltage. The timing controller 404 outputs a right eye image R1 of the three-dimensional image ID to the first liquid crystal panel 408, and outputs the control signal RL with a low voltage. The liquid crystal driver 410 outputs the voltage control signal VCS (corresponding to a second voltage V2) according to the control signal RL with the low voltage. Therefore, the liquid crystals within the second liquid crystal panel 412 are rotated to a second angle (such as 45°) according to the second voltage V2. At a period T4, because the timing controller 404 outputs the backlight control signal BCS corresponding to the vertical blanking interval VBLANK, the backlight module 406 turns on the backlight according to the backlight control signal BCS. Therefore, at the period T4, the second liquid crystal panel 412 rotates the liquid crystals within the second liquid crystal panel 412 according to the voltage control signal VCS with the second voltage V2 to make the right eye image R1 penetrating the second liquid crystal panel 412 have polarization of the second angle. Thus, aright eye of the viewer can view the right eye image R1 having the polarization of the second angle through the right eye lens 4164 at the period T4.

As shown in FIG. 6, at a period T5, because the first liquid crystal panel 408 is at a vertical position (e.g. the longer side of the first liquid crystal panel 408 is perpendicular to the horizontal plane), the direction signal DS generated by the gravity sensor 402 according to the vertical position of the first liquid crystal panel 408 is at a low voltage. That is to say, when the first liquid crystal panel 408 is at the vertical position, the gravity sensor 402 generates the direction signal DS with the low voltage according to a relationship between the three axes of the gravity sensor 402 and the direction of gravity. But the present invention is not limited to the vertical position of the first liquid crystal panel 408 being the longer side of the first liquid crystal panel 408 perpendicular to the horizontal plane, and not limited to the direction signal DS generated by the gravity sensor 402 according to the vertical position of the first liquid crystal panel 408 being at the low voltage. Meanwhile, the timing controller 404 determines to output a right eye image R2 of the three-dimensional image to the first liquid crystal panel 408 and output the control signal RL with the high voltage according to the direction signal DS. Meanwhile, the memory 414 stores a left eye image L2 of the three-dimensional image ID, where the left eye image L2 of the three-dimensional image ID should be originally outputted by the timing controller 404 to the first liquid crystal panel 408 at the period T5, but the left eye image L2 of the three-dimensional image ID is not outputted by the timing controller 404 to the first liquid crystal panel 408 at the period T5 in fact. The liquid crystal driver 410 outputs the voltage control signal VCS (corresponding to a first voltage V1) according to the control signal RL with the high voltage. Therefore, the liquid crystals within the second liquid crystal panel 412 are rotated to the first angle according to the first voltage V1. At a period T6, because the timing controller 404 outputs the backlight control signal BCS corresponding to the vertical blanking interval VBLANK, the backlight module 406 turns on the backlight according to the backlight control signal BCS. Therefore, at the period T6, because the second liquid crystal panel 412 rotates the liquid crystals within the second liquid crystal panel 412 according to the voltage control signal VCS with the first voltage V1 to make the right eye image R2 penetrating the second liquid crystal panel 104 have the polarization of the second angle. That is to say, because the first liquid crystal panel 408 is rotated 90° from the horizontal position to the vertical position, the right eye image R2 originally having the polarization of the first angle is changed to the right eye image R2 having the polarization of the second angle (because the second liquid crystal panel 412 rotates the liquid crystals within the second liquid crystal panel 412 to the first angle according to the voltage control signal VCS with the first voltage V1). Thus, a right eye of the viewer can view the right eye image R2 having the polarization of the second angle through the right eye lens 4164 at the period T6.

Similarly, at a period T7, the memory 414 outputs the left eye image L2 of the three-dimensional image ID to the timing controller 404. Then, the timing controller 404 outputs the left eye image L2 of the three-dimensional image ID to the first liquid crystal panel 408, and outputs the control signal RL with the low voltage. The liquid crystal driver 410 outputs the voltage control signal VCS (corresponding to the second voltage V2) according to the control signal RL with the low voltage. Therefore, the liquid crystals within the second liquid crystal panel 412 are rotated to the second angle according to the second voltage V2. At a period T8, because the timing controller 404 outputs the backlight control signal BCS corresponding to the vertical blanking interval VBLANK, the backlight module 406 turns on the backlight according to the backlight control signal BCS. Therefore, at the period T8, the second liquid crystal panel 412 rotates the liquid crystals within the second liquid crystal panel 412 according to the voltage control signal VCS with the second voltage V2 to make the left eye image L2 penetrating the second liquid crystal panel 412 have the polarization of the first angle. That is to say, because the first liquid crystal panel 408 is rotated 90° from the horizontal position to the vertical position, the left eye image L2 originally having the polarization of the second angle is changed to the left eye image L2 having the polarization of the first angle (because the second liquid crystal panel 412 rotates the liquid crystals within the second liquid crystal panel 412 to the second angle according to the voltage control signal VCS with the second voltage V2). Thus, the left eye of the viewer can view the left eye image L2 having the polarization of the first angle through the left eye lens 4162 at the period T8. In addition, from the period T7, the timing controller 404 accesses the left eye image or the right eye image of the three-dimensional image ID from the memory 414.

Therefore, as shown in FIG. 6, when the first liquid crystal panel 408 is at the vertical position (at the periods T5, T6, T7, and T8), the timing controller 404 changes the output sequence of the left eye image and the right eye image of the three-dimensional image ID through the memory 414. Thus, the left eye of the viewer can still correctly receive the left eye image of the three-dimensional image ID, and the right eye of the viewer can still correctly receive the right eye image of the three-dimensional image ID. But the present invention is not limited to the output sequence of the left eye image and the right eye image of the three-dimensional image ID in FIG. 6. Therefore, any configuration in which the timing controller 404 changes the output sequence of the left eye image and the right eye image of the three-dimensional image ID through the memory 414 to make the left eye of the viewer correctly receive the left eye image of the three-dimensional image ID, and the right eye of the viewer correctly receive the right eye image of the three-dimensional image ID falls within the scope of the present invention.

Figure 7:
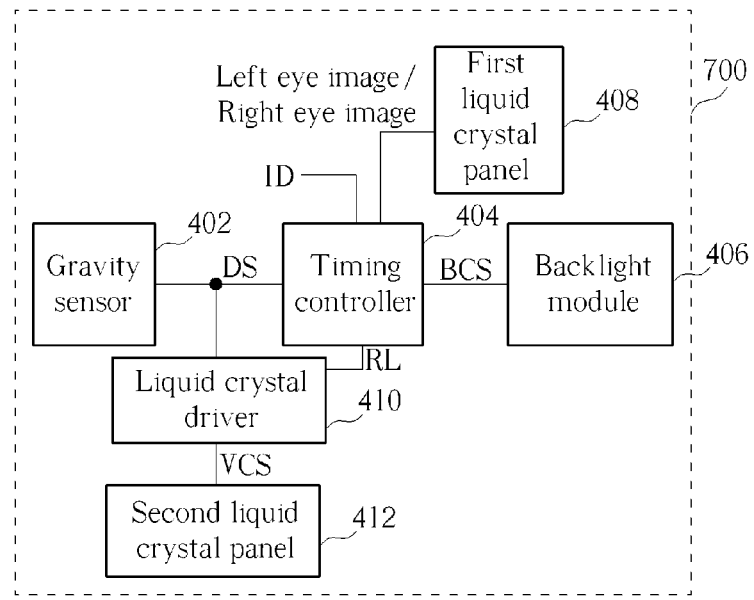
FIG. 7 is a diagram illustrating coupling relationships of a gravity sensor, a timing controller, backlight module, a first liquid crystal panel, a liquid crystal driver, and a second liquid crystal panel of a display for displaying three-dimensional images according to a second embodiment.

Please refer to FIG. 7. FIG. 7 is a diagram illustrating coupling relationships of a gravity sensor 402, a timing controller 404, backlight module 406, a first liquid crystal panel 408, a liquid crystal driver 410, and a second liquid crystal panel 412 of a display 700 for displaying three-dimensional images according to a second embodiment. As shown in FIG. 7, a difference of the display 700 and the display 400 is that the display 700 does not include a memory 414. The timing controller 404 is used for receiving a three-dimensional image ID, outputting a left eye image and a right eye image of the three-dimensional image ID in turn, outputting a control signal RL according to a timing of the three-dimensional image ID, and outputting a backlight control signal BCS corresponding to a vertical blanking interval VBLANK. The liquid crystal driver 410 is coupled to the timing controller 404 for receiving the control signal RL and a direction signal DS of the gravity sensor 402, and outputting a voltage control signal VCS according to the control signal RL and the direction signal DS. The second liquid crystal panel 412 is coupled to the liquid crystal driver 410 for rotating the liquid crystals within the second liquid crystal panel 412 according to the voltage control signal VCS. In addition, coupling relationships of the backlight module 406, the first liquid crystal panel 408, and the second liquid crystal panel 412 of the display 700 are the same as the coupling relationships of the backlight module 406, the first liquid crystal panel 408, and the second liquid crystal panel 412 of the display 400 in FIG. 4.

Figure 8:
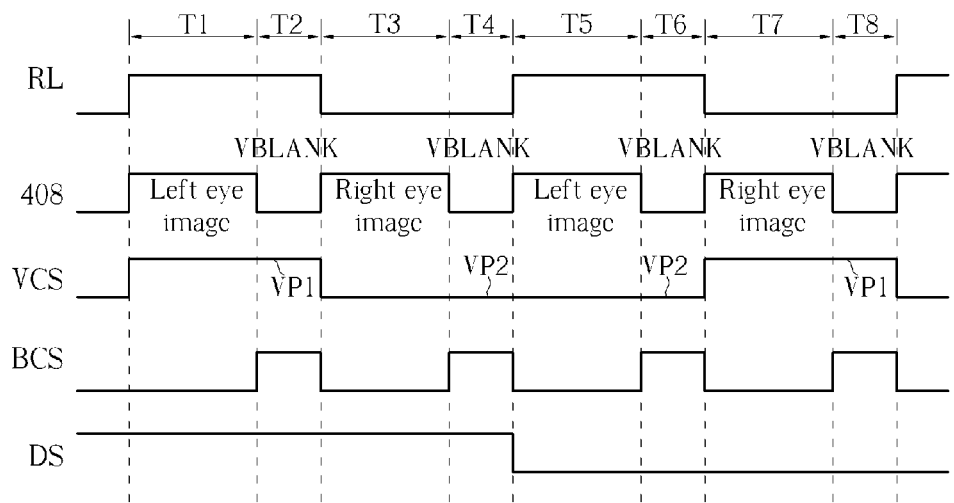
FIG. 8 is a timing diagram illustrating a control signal, output sequence of a left eye image and a right eye image outputted by the first liquid crystal panel, angles of the liquid crystals within the second liquid crystal panel, a backlight control signal, and a direction signal of the display.

Please refer to FIG. 8. FIG. 8 is a timing diagram illustrating a control signal RL, output sequence of a left eye image and a right eye image outputted by the first liquid crystal panel 408, angles of the liquid crystals within the second liquid crystal panel 412, a backlight control signal BCS, and a direction signal DS of the display 700. As shown in FIG. 8, at a period T1, because the first liquid crystal panel 408 is at a horizontal position (e.g. the longer side of the first liquid crystal panel 408 being parallel to the horizontal plane), the direction signal DS generated by the gravity sensor 402 according to the horizontal position of the first liquid crystal panel 408 has a corresponding angle 0°. That is to say, the gravity sensor 402 generates the direction signal DS with the corresponding angle 0° according to a relationship between the three axes of the gravity sensor 402 and the direction of gravity when the first liquid crystal panel 408 is at the horizontal position. But the present invention is not limited to the corresponding angle of the direction signal DS being 0° when the first liquid crystal panel 408 is at the horizontal position. The timing controller 404 outputs a left eye image of the three-dimensional image ID to the first liquid crystal panel 408, and outputs the control signal RL with a high voltage. The liquid crystal driver 410 outputs a voltage control signal VCS (corresponding to a first voltage VP1) according to the control signal RL with the high voltage and the direction signal DS with the corresponding angle 0°. Therefore, the liquid crystals within the second liquid crystal panel 412 are rotated to a first angle according to the first voltage VP1. At a period T2, because the timing controller 404 outputs the backlight control signal BCS corresponding to a vertical blanking interval VBLANK, the backlight module 406 turns on backlight according to the backlight control signal BCS. Therefore, at the period T2, the second liquid crystal panel 412 rotates the liquid crystals within the second liquid crystal panel 412 according to the voltage control signal VCS with the first voltage VP1 to make the left eye image penetrating the second liquid crystal panel 412 have polarization of the first angle, where a sum of the first angle and the corresponding angle 0° of the direction signal DS corresponds to the left eye lens 4162 of the pair of polarized glasses 416. Thus, the left eye of the viewer can view the left eye image having a polarization angle equal to the sum of the first angle and the corresponding angle 0° of the direction signal DS through the left eye lens 4162 at the period T2.

Similarly, at a period T3, because the first liquid crystal panel 408 is still at the horizontal position, the corresponding angle of the direction signal DS generated by the gravity sensor 402 is still 0°. The timing controller 404 outputs a right eye image of the three-dimensional image ID to the first liquid crystal panel 408 and outputs the control signal RL with a low voltage. The liquid crystal driver 410 outputs the voltage control signal VCS (corresponding to a second voltage VP2) according to the control signal RL with the low voltage and the direction signal DS with the corresponding angle 0°. Therefore, the liquid crystals within the second liquid crystal panel 412 are rotated to a second angle according to the second voltage VP2. At a period T4, because the timing controller 404 outputs the backlight control signal BCS corresponding to the vertical blanking interval VBLANK, the backlight module 406 turns on the backlight according to the backlight control signal BCS. Therefore, at the period T4, the second liquid crystal panel 412 rotates the liquid crystals within the second liquid crystal panel 412 according to the voltage control signal VCS with the second voltage VP2 to make the right eye image penetrating the second liquid crystal panel 412 have polarization of the second angle, where a sum of the second angle and the corresponding angle 0° of the direction signal DS corresponds to the right eye lens 4164 of the pair of polarized glasses 416. Thus, the right eye of the viewer can view the right eye image having a polarization angle equal to the sum of the second angle and the corresponding angle 0° of the direction signal DS through the right eye lens 4164 at the period T4.

As shown in FIG. 8, at a period T5, because the first liquid crystal panel 408 is at a vertical position (e.g. the longer side of the first liquid crystal panel 408 is perpendicular to the horizontal plane), the direction signal DS generated by the gravity sensor 402 according to the vertical position of the first liquid crystal panel 408 has a corresponding angle 90°. That is to say, the gravity sensor 402 generates the direction signal DS with the corresponding angle 90° according to a relationship between the three axes of the gravity sensor 402 and the direction of gravity when the first liquid crystal panel 408 is at the vertical position. But the present invention is not limited to the corresponding angle of the direction signal DS being 90° when the first liquid crystal panel 408 is at the vertical position. The timing controller 404 outputs the left eye image of the three-dimensional image ID to the first liquid crystal panel 408, and outputs the control signal RL with the high voltage. The liquid crystal driver 410 outputs the voltage control signal VCS (corresponding to the second voltage VP2) according to the control signal RL with the high voltage and the direction signal DS with the low voltage. Therefore, the liquid crystals within the second liquid crystal panel 412 are rotated to the second angle according to the second voltage VP2. At a period T6, because the timing controller 404 outputs the backlight control signal BCS corresponding to the vertical blanking interval VBLANK, the backlight module 406 turns on the backlight according to the backlight control signal BCS. Therefore, at the period T6, the second liquid crystal panel 412 rotates the liquid crystals within the second liquid crystal panel 412 according to the voltage control signal VCS with the second voltage VP2 to make the left eye image penetrating the second liquid crystal panel 412 have the polarization of the second angle, where a sum of the second angle and the corresponding angle 90° of the direction signal DS corresponds to the left eye lens 4162 of the pair of polarized glasses 416. Thus, the left eye of a viewer can view the left eye image having a polarization angle equal to the sum of the second angle and the corresponding angle 90° of the direction signal DS through the left eye lens 4162 at the period T6.

Similarly, at a period T7, because the first liquid crystal panel 408 is still at the vertical position, the corresponding angle of the direction signal DS generated by the gravity sensor 402 is still 90°. Then, the timing controller 404 outputs the right eye image of the three-dimensional image ID to the first liquid crystal panel 408 and outputs the control signal RL with the low voltage. The liquid crystal driver 410 outputs the voltage control signal VCS (corresponding to the first voltage VP1) according to the control signal RL with the low voltage and the direction signal DS with the corresponding angle 90°. Therefore, the liquid crystals within the second liquid crystal panel 412 are rotated to the first angle according to the first voltage VP1. At a period T8, because the timing controller 404 outputs the backlight control signal BCS corresponding to the vertical blanking interval VBLANK, the backlight module 406 turns on the backlight according to the backlight control signal BCS. Therefore, at the period T8, the second liquid crystal panel 412 rotates the liquid crystals within the second liquid crystal panel 412 according to the voltage control signal VCS with the first voltage VP1 to make the right eye image penetrating the second liquid crystal panel 412 have the polarization of the first angle, where a sum of the first angle and the corresponding angle 90° of the direction signal DS corresponds to the right eye lens 4164 of the pair of polarized glasses 416. Thus, the right eye of the viewer can view the right eye image having a polarization angle equal to the sum of the first angle and the corresponding angle 90° of the direction signal DS through the right eye lens 4164 at the period T8.

Therefore, as shown in FIG. 8, when the first liquid crystal panel 408 is at the vertical position (at the periods T5, T6, T7, and T8), the liquid crystal driver 410 outputs the corresponding voltage control signal VCS through the control signal RL and the direction signal DS. Then, the liquid crystals within the second liquid crystal panel 412 are rotated to the corresponding angle according to the corresponding voltage control signal VCS. Thus, the left eye of the viewer can still correctly receive the left eye image of the three-dimensional image ID, and the right eye of the viewer can still correctly receive the right eye image of the three-dimensional image ID.

Figure 9:
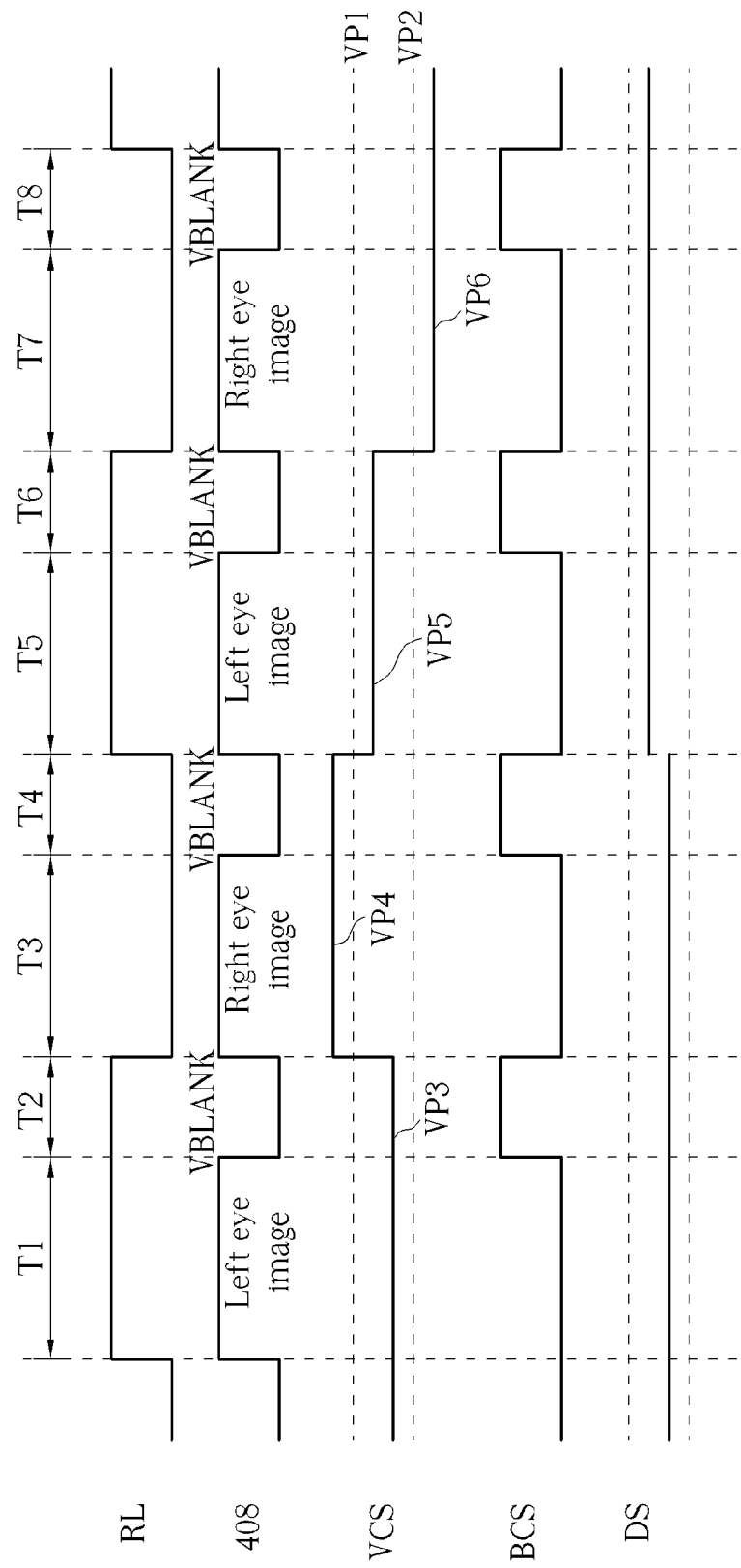
FIG. 9 is a timing diagram illustrating a control signal, output sequence of a left eye image and a right eye image outputted by the first liquid crystal panel, angles of the liquid crystals within the second liquid crystal panel, a backlight control signal, and a direction signal of the display.

Please refer to FIG. 9. FIG. 9 is a timing diagram illustrating a control signal RL, output sequence of a left eye image and a right eye image outputted by the first liquid crystal panel 408, angles of the liquid crystals within the second liquid crystal panel 412, a backlight control signal BCS, and a direction signal DS of the display 700. As shown in FIG. 9, at a period T1, because the first liquid crystal panel 408 is at a first position, the direction signal DS generated by the gravity sensor 402 according to the first position of the first liquid crystal panel 408 has a corresponding angle $\theta 1$. That is to say, the gravity sensor 402 generates the direction signal DS with the corresponding angle $\theta 1$ according to a relationship between the three axes of the gravity sensor 402 and the direction of gravity when the first liquid crystal panel 408 is at the first position. The timing controller 404 outputs a left eye image of the three-dimensional image ID to the first liquid crystal panel 408, and outputs the control signal RL with a high voltage. The liquid crystal driver 410 outputs a voltage control signal VCS (corresponding to a third voltage VP3) according to the control signal RL with the high voltage and the direction signal DS with the corresponding angle $\theta 1$. Therefore, the liquid crystals within the second liquid crystal panel 412 are rotated to a third angle according to the third voltage VP3. At a period T2, because the timing controller 404 outputs the backlight control signal BCS corresponding to a vertical blanking interval VBLANK, the backlight module 406 turns on backlight according to the backlight control signal BCS. Therefore, at the period T2, the second liquid crystal panel 412 rotates the liquid crystals within the second liquid crystal panel 412 according to the voltage control signal VCS with the third voltage VP3 to make the left eye image penetrating the second liquid crystal panel 412 have polarization of the third angle, where a sum of the third angle and the corresponding angle $\theta 1$ of the direction signal DS corresponds to the left eye lens 4162 of the pair of polarized glasses 416. Thus, the left eye of the viewer can view the left eye image having a polarization angle equal to the sum of the third angle and the corresponding angle $\theta 1$ of the direction signal DS through the left eye lens 4162 at the period T2.

Similarly, at a period T3, because the first liquid crystal panel 408 is still at the first position, the corresponding angle of the direction signal DS generated by the gravity sensor 402 is still $\theta 1$. The timing controller 404 outputs a right eye image of the three-dimensional image ID to the first liquid crystal panel 408 and outputs the control signal RL with a low voltage. The liquid crystal driver 410 outputs the voltage control signal VCS (corresponding to a fourth voltage VP4) according to the control signal RL with the low voltage and the direction signal DS with the corresponding angle $\theta 1$. Therefore, the liquid crystals within the second liquid crystal panel 412 are rotated to a fourth angle according to the fourth voltage VP4. At a period T4, because the timing controller 404 outputs the backlight control signal BCS corresponding to the vertical blanking interval VBLANK, the backlight module 406 turns on the backlight according to the backlight control signal BCS. Therefore, at the period T4, the second liquid crystal panel 412 rotates the liquid crystals within the second liquid crystal panel 412 according to the voltage control signal VCS with the fourth voltage VP4 to make the right eye image penetrating the second liquid crystal panel 412 have polarization of the fourth angle, where a sum of the fourth angle and the corresponding angle $\theta 1$ of the direction signal DS corresponds to the right eye lens 4164 of the pair of polarized glasses 416. Thus, the right eye of the viewer can view the right eye image having a polarization angle equal to the sum of the fourth angle and the corresponding angle $\theta 1$ of the direction signal DS through the right eye lens 4164 at the period T4.

As shown in FIG. 9, at a period T5, because the first liquid crystal panel 408 is at a second position, the direction signal DS generated by the gravity sensor 402 according to the second position of the first liquid crystal panel 408 has a corresponding angle $\theta 2$. That is to say, the gravity sensor 402 generates the direction signal DS with the corresponding angle $\theta 2$ according to a relationship between the three axes of the gravity sensor 402 and the direction of gravity when the liquid crystal panel 408 is at the second position. The timing controller 404 outputs the left eye image of the three-dimensional image ID to the first liquid crystal panel 408, and outputs the control signal RL with the high voltage. The liquid crystal driver 410 outputs the voltage control signal VCS (corresponding to a fifth voltage VP5) according to the control signal RL with the high voltage and the direction signal DS with the corresponding angle $\theta 2$. Therefore, the liquid crystals within the second liquid crystal panel 412 are rotated to a fifth angle according to the fifth voltage VP5. At a period T6, because the timing controller 404 outputs the backlight control signal BCS corresponding to the vertical blanking interval VBLANK, the backlight module 406 turns on the backlight according to the backlight control signal BCS. Therefore, at the period T6, the second liquid crystal panel 412 rotates the liquid crystals within the second liquid crystal panel 412 according to the voltage control signal VCS with the fifth voltage VP5 to make the left eye image penetrating the second liquid crystal panel 412 have polarization of the fifth angle, where a sum of the fifth angle and the corresponding angle $\theta 2$ of the direction signal DS corresponds to the left eye lens 4162 of the pair of polarized glasses 416. Thus, the left eye of the viewer can view the left eye image having a polarization angle equal to the sum of the fifth angle and the corresponding angle $\theta 2$ of the direction signal DS through the left eye lens 4162 at the period T6.

Similarly, at a period T7, because the first liquid crystal panel 408 is still at the second position, the corresponding angle of the direction signal DS generated by the gravity sensor 402 is still $\theta 2$. Then, the timing controller 404 outputs the right eye image of the three-dimensional image ID to the first liquid crystal panel 408 and outputs the control signal RL with the low voltage. The liquid crystal driver 410 outputs the voltage control signal VCS (corresponding to a sixth voltage VP6) according to the control signal RL with the low voltage and the direction signal DS with the corresponding angle $\theta 2$. Therefore, the liquid crystals within the second liquid crystal panel 412 are rotated to a sixth angle according to the sixth voltage VP6. At a period T8, because the timing controller 404 outputs the backlight control signal BCS corresponding to the vertical blanking interval VBLANK, the backlight module 406 turns on the backlight according to the backlight control signal BCS. Therefore, at the period T8, the second liquid crystal panel 412 rotates the liquid crystals within the second liquid crystal panel 412 according to the voltage control signal VCS with the sixth voltage VP6 to make the right eye image penetrating the second liquid crystal panel 412 have polarization of the sixth angle, where a sum of the sixth angle and the corresponding angle $\theta 2$ of the direction signal DS corresponds to the right eye lens 4164 of the pair of polarized glasses 416. Thus, the right eye of the viewer can view the right eye image having a polarization angle equal to the sum of the sixth angle and the corresponding angle θ2 of the direction signal DS through the right eye lens 4164 at the period T8.

Therefore, as shown in FIG. 9, when the first liquid crystal panel 408 is at the first position and the second position (the periods T1-T8), the liquid crystal driver 410 outputs the corresponding voltage control signal VCS according to the control signal RL and the direction signal DS. Then, the liquid crystals within the second liquid crystal panel 412 are rotated to the corresponding angle according to the corresponding voltage control signal VCS. Thus, the left eye of the viewer can still correctly receive the left eye image of the three-dimensional image ID, and the right eye of the viewer can also still correctly receive the right eye image of the three-dimensional image ID.

Figure 10:
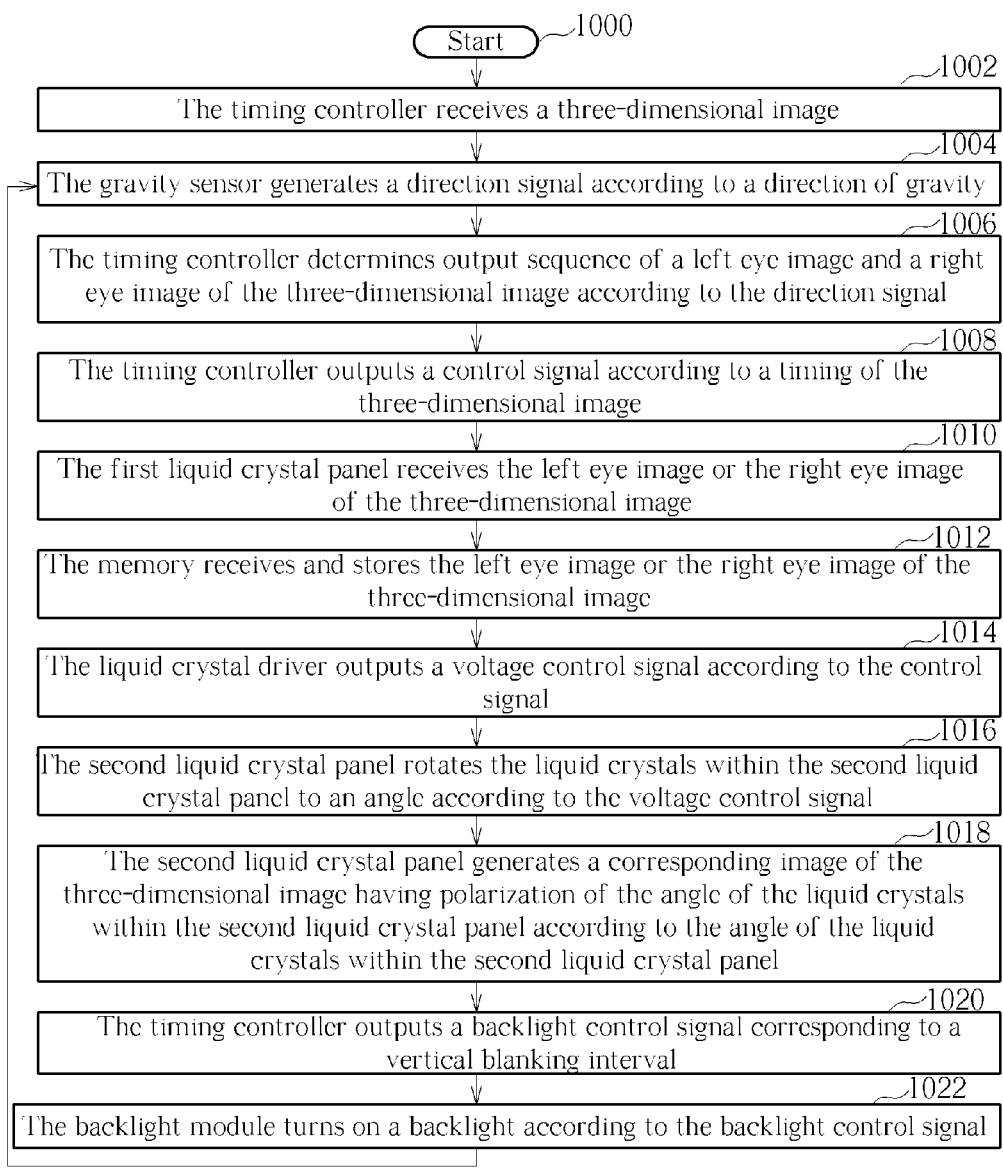
FIG. 10 is a flowchart illustrating a method for displaying three-dimensional images according to a third embodiment.

Please refer to FIG. 10, FIG. 4, FIG. 5, and FIG. 6. FIG. 10 is a flowchart illustrating a method for displaying three-dimensional images according to a third embodiment. The method in FIG. 10 is illustrated using the display 400 in FIG. 4. Detailed steps are as follows:

Step 1000: Start.

Step 1002: The timing controller receives a three-dimensional image ID.

Step 1004: The gravity sensor generates a direction signal DS according to a direction of gravity.

Step 1006: The timing controller determines output sequence of a left eye image and a right eye image of the three-dimensional image ID according to the direction signal DS.

Step 1008: The timing controller outputs a control signal RL according to a timing of the three-dimensional image ID.

Step 1010: The first liquid crystal panel receives the left eye image or the right eye image of the three-dimensional image ID.

Step 1012: The memory receives and stores the left eye image or the right eye image of the three-dimensional image ID.

Step 1014: The liquid crystal driver outputs a voltage control signal VCS according to the control signal RL.

Step 1016: The second liquid crystal panel rotates the liquid crystals within the second liquid crystal panel to an angle according to the voltage control signal VCS.

Step 1018: The second liquid crystal panel generates a corresponding image of the three-dimensional image ID having polarization of the angle of the liquid crystals within the second liquid crystal panel according to the angle of the liquid crystals within the second liquid crystal panel.

Step 1020: The timing controller 404 outputs a backlight control signal BCS corresponding to a vertical blanking interval VBLANK.

Step 1022: The backlight module turns on a backlight according to the backlight control signal BCS; go to Step 1004.

The period T1 to the period T2 in FIG. 6 is taken as an example. In Step 1004, when the first liquid crystal panel 408 is at the horizontal position, the gravity sensor 402 generates the direction signal DS with the high voltage according to the relationship between the three axes of the gravity sensor 402 and the direction of gravity. In Step 1006, the timing controller 404 determines to first output the left eye image of the three-dimensional image ID according to the direction signal DS. In Step 1008, the timing controller 404 outputs the control signal RL with the high voltage according to the timing of the three-dimensional image ID at the period T1. In Step 1010, the first liquid crystal panel 408 receives and displays the left eye image of the three-dimensional image ID outputted from the timing controller 404. However, because the backlight is not turned on, meanwhile, the left eye of the viewer can still not view the left eye image of the three-dimensional image ID through the first liquid crystal panel 408, the second liquid crystal panel 412, and the left eye lens 4162. In Step 1012, the memory 414 receives and stores the left eye image or the right eye image of the three-dimensional image ID. In Step 1014, the liquid crystal driver 410 outputs the voltage control signal VCS (corresponding to the first voltage V1) according to the control signal RL with the high voltage. In Step 1016, the second liquid crystal panel 412 rotates the liquid crystals within the second liquid crystal panel 412 to the first angle according to the voltage control signal VCS (corresponding to the first voltage V1). In Step 1018, the second liquid crystal panel 412 generates the left eye image of the three-dimensional image ID having the polarization of the first angle according to the angle (the first angle) of the liquid crystals within the second liquid crystal panel 412. In Step 1020, the timing controller 404 outputs the backlight control signal BCS corresponding to the vertical blanking interval VBLANK at the period T2. In Step 1022, at the period T2, the backlight module 406 turns on the backlight according to the backlight control signal BCS. Therefore, the left eye of the viewer can view the left eye image having the polarization of the first angle through the left eye lens 4162 at the period T2.

In addition, at the periods T3 to T8 in FIG. 6, subsequent operational principles of the gravity sensor 402, the timing controller 404, the backlight module 406, the first liquid crystal panel 408, the liquid crystal driver 410, the second liquid crystal panel 412, and the memory 414 are the same as those of the gravity sensor 402, the timing controller 404, the backlight module 406, the first liquid crystal panel 408, the liquid crystal driver 410, the second liquid crystal panel 412, and the memory 414 at the periods T1 to T2 in FIG. 6, so further description thereof is omitted for simplicity.

Figure 11:
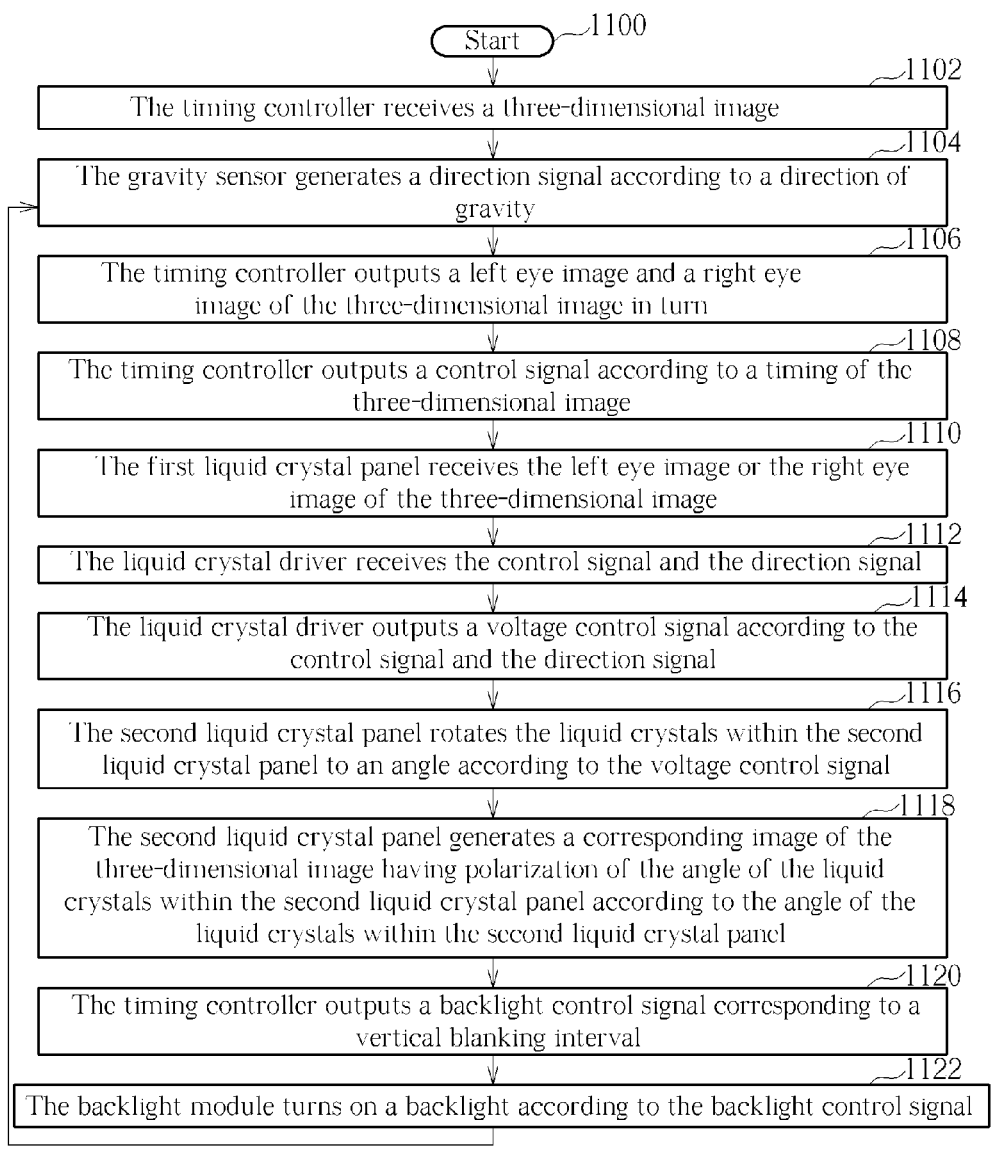
FIG. 11 is a flowchart illustrating a method for displaying three-dimensional images according to a fourth embodiment.

Please refer to FIG. 11, FIG. 4, FIG. 7, FIG. 8, and FIG. 9. FIG. 11 is a flowchart illustrating a method for displaying three-dimensional images according to a fourth embodiment. The method in FIG. 10 is illustrated using the display 700 in FIG. 7. Detailed steps are as follows:

Step 1100: Start.

Step 1102: The timing controller receives a three-dimensional image ID.

Step 1104: The gravity sensor generates a direction signal DS according to a direction of gravity.

Step 1106: The timing controller outputs a left eye image and a right eye image of the three-dimensional image ID in turn.

Step 1108: The timing controller outputs a control signal RL according to a timing of the three-dimensional image ID.

Step 1110: The first liquid crystal panel receives the left eye image or the right eye image of the three-dimensional image ID.

Step 1112: The liquid crystal driver receives the control signal RL and the direction signal DS.

Step 1114: The liquid crystal driver outputs a voltage control signal VCS according to the control signal RL and the direction signal DS.

Step 1116: The second liquid crystal panel rotates the liquid crystals within the second liquid crystal panel to an angle according to the voltage control signal VCS.

Step 1118: The second liquid crystal panel generates a corresponding image of the three-dimensional image ID having polarization of the angle of the liquid crystals within the second liquid crystal panel according to the angle of the liquid crystals within the second liquid crystal panel.

Step 1120: The timing controller outputs a backlight control signal BCS corresponding to a vertical blanking interval VBLANK.

Step 1122: The backlight module turns on a backlight according to the backlight control signal BCS; go to Step 1104.

The period T1 to the period T2 in FIG. 8 is taken as an example. In Step 1104, when the first liquid crystal panel 408 is at the horizontal position, the gravity sensor 402 generates the direction signal DS with the corresponding angle 0° according to a relationship between the three axes of the gravity sensor 402 and the direction of gravity. In Step 1106, the timing controller 404 outputs the left eye image of the three-dimensional image ID. In Step 1108, the timing controller 404 outputs the control signal RL with the high voltage according to the timing of the three-dimensional image ID at the period T1. In Step 1110, the first liquid crystal panel 408 receives and displays the left eye image of the three-dimensional image ID outputted from the timing controller 404. However, because the backlight is not turned on, meanwhile, the left eye of the viewer can still not view the left eye image of the three-dimensional image ID through the first liquid crystal panel 408, the second liquid crystal panel 412, and the left eye lens 4162. In Step 1112, the liquid crystal driver 410 receives the control signal RL and the direction signal DS with the corresponding angle 0°. In Step 1114, the liquid crystal driver 410 outputs the voltage control signal VCS (corresponding to the first voltage VP1) according to the control signal RL and the direction signal DS with the corresponding angle 0°. In Step 1116, the second liquid crystal panel 412 rotates the liquid crystals within the second liquid crystal panel 412 to the first angle according to the voltage control signal VCS (corresponding to first voltage VP1). In Step 1118, the second liquid crystal panel 412 generates the left eye image of the three-dimensional image ID having the polarization of the first angle according to the angle (the first angle) of the liquid crystals within the second liquid crystal panel 412. In Step 1120, the timing controller 404 outputs the backlight control signal BCS corresponding to the vertical blanking interval VBLANK at the period T2. In Step 1122, at the period T2, the backlight module 406 turns on the backlight according to the backlight control signal BCS, where a sum of the first angle and the corresponding angle 0° of the direction signal DS corresponds to the left eye lens 4162 of the pair of polarized glasses 416. Therefore, the left eye of the viewer can view the left eye image having a polarization angle equal to the sum of the first angle and the corresponding angle 0° of the direction signal DS through the left eye lens 4162 at the period T2.

In addition, at the periods T3 to T8 in FIG. 8, subsequent operational principles of the gravity sensor 402, the timing controller 404, the backlight module 406, the first liquid crystal panel 408, the liquid crystal driver 410, and the second liquid crystal panel 412 are the same as those of the gravity sensor 402, the timing controller 404, the backlight module 406, the first liquid crystal panel 408, the liquid crystal driver 410, and the second liquid crystal panel 412 at the periods T1 to T2 in FIG. 8, so further description thereof is omitted for simplicity.

In addition, take the period T1 to the period T2 in FIG. 9 as an example. In Step 1104, when the first liquid crystal panel 408 is at the horizontal position, the gravity sensor 402 generates the direction signal DS with the corresponding angle θ1 according to a relationship between the three axes of the gravity sensor 402 and the direction of gravity. In Step 1106, the timing controller 404 outputs the left eye image of the three-dimensional image ID. In Step 1108, the timing controller 404 outputs the control signal RL with the high voltage according to the timing of the three-dimensional image ID at the period T1. In Step 1110, the first liquid crystal panel 408 receives and displays the left eye image of the three-dimensional image ID outputted from the timing controller 404. However, because the backlight is not turned on, meanwhile, the left eye of the viewer can still not view the left eye image of the three-dimensional image ID through the first liquid crystal panel 408, the second liquid crystal panel 412, and the left eye lens 4162. In Step 1112, the liquid crystal driver 410 receives the control signal RL and the direction signal DS with the corresponding angle θ1. In Step 1114, the liquid crystal driver 410 outputs the voltage control signal VCS (corresponding to the third voltage VP3) according to the control signal RL and the direction signal DS with the corresponding angle θ1. In Step 1116, the second liquid crystal panel 412 rotates the liquid crystals within the second liquid crystal panel 412 to the third angle according to the voltage control signal VCS (corresponding to the third voltage VP3). In Step 1118, the second liquid crystal panel 412 generates the left eye image of the three-dimensional image ID having the polarization of the third angle according to the angle (the third angle) of the liquid crystals within the second liquid crystal panel 412. In Step 1120, the timing controller 404 outputs the backlight control signal BCS corresponding to the vertical blanking interval VBLANK at the period T2. In Step 1122, at the period T2, the backlight module 406 turns on the backlight according to the backlight control signal BCS, where a sum of the third angle and the corresponding angle θ1 of the direction signal DS corresponds to the left eye lens 4162 of the pair of polarized glasses 416. Therefore, the left eye of the viewer can view the left eye image having a polarization angle equal to the sum of the first angle and the corresponding angle θ1 of the direction signal DS through the left eye lens 4162 at the period T2.

In addition, at the periods T3 to T8 in FIG. 9, subsequent operational principles of the gravity sensor 402, the timing controller 404, the backlight module 406, the first liquid crystal panel 408, the liquid crystal driver 410, and the second liquid crystal panel 412 are the same as those of the gravity sensor 402, the timing controller 404, the backlight module 406, the first liquid crystal panel 408, the liquid crystal driver 410, and the second liquid crystal panel 412 at the periods T1 to T2 in FIG. 9, so further description thereof is omitted for simplicity.

To sum up, the display for displaying three-dimensional images and the method for displaying three-dimensional images utilize the gravity sensor to generate a direction signal, and the timing controller to output a control signal. Then, the timing controller determines output sequence of a left eye image and a right eye image of a three-dimensional image according to the direction signal, and the liquid crystal driver generates a voltage control signal according to the control signal, or according to the control signal and the direction signal. Therefore, the second liquid crystal panel can rotate the liquid crystals within the second liquid crystal panel to a corresponding angle according to the voltage control signal. Thus, regardless of the display being rotated to any position, the viewer can still view correct three-dimensional images through the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display for displaying three-dimensional images, the display comprising:
   a gravity sensor for generating a direction signal according to a direction of gravity;
   a timing controller for receiving a three-dimensional image, determining output sequence of a left eye image and a right eye image of the three-dimensional image according to the direction signal, outputting a control signal according to a timing of the three-dimensional image, and outputting a backlight control signal corresponding to a vertical blanking interval;
   a backlight module coupled to the timing controller for turning on a backlight according to the backlight control signal;
   a first liquid crystal panel coupled to the timing controller for receiving and displaying the left eye image and the right eye image of the three-dimensional image;
   a liquid crystal driver coupled to the timing controller for outputting a voltage control signal according to the control signal;
   a second liquid crystal panel coupled to the liquid crystal driver for rotating liquid crystals within the second liquid crystal panel to a first angle or a second angle according to the voltage control signal; and
   a memory coupled to the timing controller for receiving and storing the left eye image and the right eye image of the three-dimensional image;
   wherein the first angle corresponds to a left eye lens of a pair of polarized glasses and the second angle corresponds to a right eye lens of the pair of polarized glasses.

2. The display of claim 1, wherein the liquid crystals within the second liquid crystal panel are rotated to the first angle according to a first voltage when the voltage control signal is at the first voltage; and the liquid crystals within the second liquid crystal panel are rotated to the second angle according to a second voltage when the voltage control signal is at the second voltage.

3. The display of claim 2, wherein the left eye image of the three-dimensional image has polarization of the first angle after the left eye image of the three-dimensional image penetrates the first liquid crystal panel and the second liquid crystal panel when the direction signal is at a high voltage and the voltage control signal is at the first voltage; and the right eye image of the three-dimensional image has polarization of the second angle after the right eye image of the three-dimensional image penetrates the first liquid crystal panel and the second liquid crystal panel when the direction signal is at the high voltage and the voltage control signal is at the second voltage.

4. The display of claim 2, wherein the right eye image of the three-dimensional image has polarization of the first angle after the right eye image of the three-dimensional image penetrates the first liquid crystal panel and the second liquid crystal panel when the direction signal is at a low voltage and the voltage control signal is at the first voltage; and the left eye image of the three-dimensional image has polarization of the second angle after the left eye image of the three-dimensional image penetrates the first liquid crystal panel and the second liquid crystal panel when the direction signal is at the low voltage and the voltage control signal is at the second voltage.

5. The display of claim 1, wherein the memory receives and stores the right eye image of the three-dimensional image when the timing controller outputs the left eye image of the three-dimensional image; and the memory receives and stores the left eye image of the three-dimensional image when the timing controller outputs the right eye image of the three-dimensional image.

6. A display for displaying three-dimensional images, the display comprising:
   a gravity sensor for generating a direction signal according to a direction of gravity, wherein the direction signal has a corresponding angle;
   a timing controller for receiving a three-dimensional image, outputting a left eye image and a right eye image of the three-dimensional image in turn, outputting a control signal according to a timing of the three-dimensional image, and outputting a backlight control signal corresponding to a vertical blanking interval;
   a backlight module coupled to the timing controller for turning on a backlight according to the backlight control signal;
   a first liquid crystal panel coupled to the timing controller for receiving and displaying the left eye image and the right eye image of the three-dimensional image;
   a liquid crystal driver coupled to the timing controller for receiving the control signal and the direction signal, and outputting a voltage control signal according to the control signal and the direction signal; and
   a second liquid crystal panel coupled to the liquid crystal driver for rotating liquid crystals within the second liquid crystal panel according to the voltage control signal.

7. The display of claim 6, wherein the liquid crystal driver outputting the voltage control signal according to the control signal and the direction signal is the liquid crystal driver outputting the voltage control signal with a first voltage according to a high voltage and the direction signal when the control signal is at the high voltage and the timing controller outputs the left eye image of the three-dimensional image.

8. The display of claim 7, wherein liquid crystals within the second liquid crystal panel are rotated to a first angle according to the first voltage, the left eye image of the three-dimensional image has a polarization angle equal to a sum of the first angle and the corresponding angle after the left eye image of the three-dimensional image penetrates the first liquid crystal panel and the second liquid crystal panel, and the sum of the first angle and the corresponding angle corresponds to a left eye lens of a pair of polarized glasses.

9. The display of claim 6, wherein the liquid crystal driver outputting the voltage control signal according to the control signal and the direction signal is the liquid crystal driver outputting the voltage control signal with a second voltage according to a low voltage and the direction signal when the control signal is at the low voltage and the timing controller outputs the right eye image of the three-dimensional image.

10. The display of claim 9, wherein liquid crystals within the second liquid crystal panel are rotated to a second angle according to the second voltage, the right eye image of the three-dimensional image has a polarization angle equal to a sum of the second angle and the corresponding angle after the right eye image of the three-dimensional image penetrates the first liquid crystal panel and the second liquid crystal panel, and the sum of the second angle and the corresponding angle corresponds to a right eye lens of a pair of polarized glasses.

11. A method for displaying three-dimensional images, the method comprising:
   receiving a three-dimensional image;
   generating a direction signal according to a direction of gravity;
   determining output sequence of a left eye image and a right eye image of the three-dimensional image according to the direction signal;

outputting a control signal according to a timing of the three-dimensional image;

receiving and displaying the left eye image or the right eye image of the three-dimensional image;

receiving and storing the left eye image or the right eye image of the three-dimensional image;

outputting a voltage control signal according to the control signal;

rotating liquid crystals within a second liquid crystal panel to an angle according to the voltage control signal;

generating a corresponding image of the three-dimensional image having polarization of the angle of the liquid crystals according to the angle of the liquid crystals within the second liquid crystal panel;

outputting a backlight control signal corresponding to a vertical blanking interval; and turning on a backlight according to the backlight control signal.

12. The method of claim 11, wherein rotating the angle of the liquid crystals within the second liquid crystal panel according to the voltage control signal comprises:

rotating the liquid crystals within the second liquid crystal panel to a first angle according to a first voltage when the direction signal is at a high voltage and the voltage control signal is at the first voltage.

13. The method of claim 12, wherein generating the corresponding image of the three-dimensional image having the polarization of the angle of the liquid crystals according to the angle of the liquid crystals within the second liquid crystal panel comprises:

generating the left eye image of the three-dimensional image having polarization of the first angle through a first liquid crystal panel and the second liquid crystal panel.

14. The method of claim 11, wherein rotating the angle of the liquid crystals within the second liquid crystal panel according to the voltage control signal comprises:

rotating the liquid crystals within the second liquid crystal panel to a second angle according to a second voltage when the direction signal is at a high voltage and the voltage control signal is at the second voltage.

15. The method of claim 14, wherein generating the corresponding image of the three-dimensional image having the polarization of the angle of the liquid crystals according to the angle of the liquid crystals within the second liquid crystal panel comprises:

generating the right eye image of the three-dimensional image having polarization of the second angle through a first liquid crystal panel and the second liquid crystal panel.

16. The method of claim 11, wherein rotating the angle of the liquid crystals within the second liquid crystal panel according to the voltage control signal comprises:

rotating the liquid crystals within the second liquid crystal panel to a first angle according to a first voltage when the direction signal is at a low voltage and the voltage control signal is at the first voltage.

17. The method of claim 16, wherein generating the corresponding image of the three-dimensional image having the polarization of the angle of the liquid crystals according to the angle of the liquid crystals within the second liquid crystal panel comprises:

generating the right eye image of the three-dimensional image having polarization of the first angle through a first liquid crystal panel and the second liquid crystal panel.

18. The method of claim 11, wherein rotating the angle of the liquid crystals within the second liquid crystal panel according to the voltage control signal comprises:

rotating the liquid crystals within the second liquid crystal panel to a second angle according to a second voltage when the direction signal is at a low voltage and the voltage control signal is at the second voltage.

19. The method of claim 18, wherein generating the corresponding image of the three-dimensional image having the polarization of the angle of the liquid crystals according to the angle of the liquid crystals within the second liquid crystal panel comprises:

generating the left eye image of the three-dimensional image having polarization of the second angle through a first liquid crystal panel and the second liquid crystal panel.

20. The method of claim 11, wherein receiving and storing the left eye image and the right eye image of the three-dimensional image is a memory receiving and storing the right eye image of the three-dimensional image when a timing controller outputs the left eye image of the three-dimensional image; and the memory receiving and storing the left eye image of the three-dimensional image when the timing controller outputs the right eye image of the three-dimensional image.

21. A method for displaying three-dimensional images, the method comprising:

receiving a three-dimensional image;

generating a direction signal according to a direction of gravity, wherein the direction signal has a corresponding angle;

outputting a left eye image and a right eye image of the three-dimensional image in turn;

outputting a control signal according to a timing of the three-dimensional image;

receiving and displaying the left eye image or the right eye image of the three-dimensional image;

receiving the control signal and the direction signal;

outputting a voltage control signal according to the control signal and the direction signal;

rotating liquid crystals within a second liquid crystal panel to an angle according to the voltage control signal;

generating a corresponding image of the three-dimensional image having polarization of the angle of the liquid crystals according to the angle of liquid crystals within the second liquid crystal panel;

outputting a backlight control signal corresponding to a vertical blanking interval; and turning on a backlight according to the backlight control signal.

22. The method of claim 21, wherein rotating the angle of the liquid crystals within the second liquid crystal panel according to the voltage control signal comprises:

the liquid crystal driver generating a first voltage according to a high voltage and the corresponding angle when the control signal is at the high voltage and a timing controller outputs the left eye image of the three-dimensional image; and rotating the liquid crystals within the second liquid crystal panel to a first angle according to the first voltage, wherein a sum of the first angle and the corresponding angle corresponds to a left eye lens of a pair of polarized glasses.

23. The method of claim 21, wherein rotating the angle of the liquid crystals within the second liquid crystal panel according to the voltage control signal comprises:

the liquid crystal driver generating a second voltage according to a low voltage and the corresponding angle when the control signal is at the low voltage and a timing controller outputs the right eye image of the three-dimensional image; and rotating the liquid crystals within the second liquid crystal panel to a second angle according to the second voltage, wherein a sum of the second angle and the corresponding angle corresponds to a right eye lens of a pair of polarized glasses.

* * * * *